(12) United States Patent
Nerone

(10) Patent No.: US 7,950,313 B2
(45) Date of Patent: May 31, 2011

(54) METHOD AND APPARATUS FOR REMOVING BOILER TUBE STUBS

(75) Inventor: Stephen Nerone, Seekonk, MA (US)

(73) Assignee: Esco Technologies, Inc., Holliston, MA (US)

( * ) Notice: Subject to any disclaimer, the term of this patent is extended or adjusted under 35 U.S.C. 154(b) by 138 days.

(21) Appl. No.: 12/456,070

(22) Filed: Jun. 11, 2009

(65) Prior Publication Data

US 2009/0324353 A1 Dec. 31, 2009

Related U.S. Application Data

(63) Continuation-in-part of application No. 12/215,951, filed on Jul. 1, 2008, now Pat. No. 7,905,686.

(60) Provisional application No. 60/958,017, filed on Jul. 2, 2007.

(51) Int. Cl.
*B23B 5/00* (2006.01)
*B23B 5/12* (2006.01)

(52) U.S. Cl. ............................................. 82/1.11; 82/47
(58) Field of Classification Search .................... 407/33; 82/1.11, 47, 113, 158; 408/80, 201; 29/890.031
See application file for complete search history.

(56) References Cited

U.S. PATENT DOCUMENTS

| | | | | |
|---|---|---|---|---|
| 2,409,776 A * | 10/1946 | Maples | ............................ | 407/44 |
| 3,532,010 A * | 10/1970 | Klintworth | .................... | 408/201 |
| 5,947,655 A * | 9/1999 | Ramsey | ............................ | 408/80 |
| 5,974,642 A * | 11/1999 | Weeks et al. | .................... | 29/33 T |
| 6,205,895 B1 * | 3/2001 | Schartinger et al. | ............... | 82/47 |
| 6,206,618 B1 * | 3/2001 | Ramsey | ............................ | 408/80 |
| 7,093,360 B1 * | 8/2006 | Craig | ........................ | 29/890.031 |
| 7,513,023 B2 * | 4/2009 | Keiper | ........................ | 29/402.01 |
| 7,513,719 B2 * | 4/2009 | Keiper | ............................. | 408/82 |

* cited by examiner

*Primary Examiner* — Will Fridie, Jr.

(74) *Attorney, Agent, or Firm* — Devine, Millimet & Branch; Paul C. Remus; Raymond I. Bruttomesso, Jr.

(57) ABSTRACT

A rotary milling head removing all but a shell of a boiler tube stub and a plug to punch out from the boiler drum the remaining boiler tube stub.

2 Claims, 3 Drawing Sheets

METHOD AND APPARATUS FOR REMOVING BOILER TUBE STUBS

CROSS-REFERENCE TO RELATED APPLICATIONS

The present application is a continuation-in-part application of patent application Ser. No. 12/215,951 filed Jul. 1, 2008, now U.S. Pat. No. 7,905,686 which claims the benefit of provisional patent application 60/958,017 filed Jul. 2, 2007, which are incorporated herein by reference.

TECHNICAL FIELD OF THE INVENTION

The present invention relates to a system for removing boiler tube stubs. More specifically, it relates to the use of a rotary cutting tool and plug to remove the boiler tube stubs quickly and economically without damaging the boiler drum.

BACKGROUND OF THE INVENTION

Commercial boilers generally have multiple drums or heads (collectively, "drums") interconnected with numerous steel boiler tubes in the range of 1-5 inches in diameter. As shown in FIG. 1, an end 1 of a boiler tube 2 is inserted through an opening 3 in a boiler drum 4 (represented here by a section of boiler drum) so that the end 1 extends into the boiler drum 4.

Boiler tubes are routinely replaced for repair or maintenance. Boiler tube removal has been achieved in the prior art by cutting the tube close to the exterior periphery of the drum opening and then notching the remaining boiler tube stub with a torch and mechanically forcing the stub out of the opening in the drum into the drum. This often leads to damage to the opening in the drum.

Other techniques in the prior art for removing boiler tube stubs include using a special tool to slit the stub through its entire length, as described in U.S. Pat. No. 5,974,642. This technique requires expensive special purpose cutting tools.

Still another technique, as described in U.S. Pat. No. 7,093,360, involves a piloted rotary cutting tool that is inserted in the stub and used to remove all but a thin shell of the stub. As shown in FIG. 2, the remaining thin shell 11 of the stub 12 is then manually peeled away from the periphery of the opening 13 in the drum 14 by a collapsing tool 15. This technique is time consuming and may score the periphery of the opening 13 in the drum 14.

SUMMARY OF THE INVENTION

The present invention is a rotary cutting tool and plug to remove boiler tube stubs. It includes a rotary cutting tool to remove all but a shell of a boiler tube stub and a plug to punch out the remaining boiler tube stub.

BRIEF DESCRIPTION OF THE DRAWINGS

These and other features and advantages of the present invention will be better understood by reading the following detailed description, taken together with the drawings wherein.

DETAILED DESCRIPTION OF PREFERRED EMBODIMENTS

The present invention is a rotary cutting tool, or other means, to remove all but a shell of a boiler tube stub and a plug to punch out from the boiler drum the remaining boiler tube stub.

Figure 1:
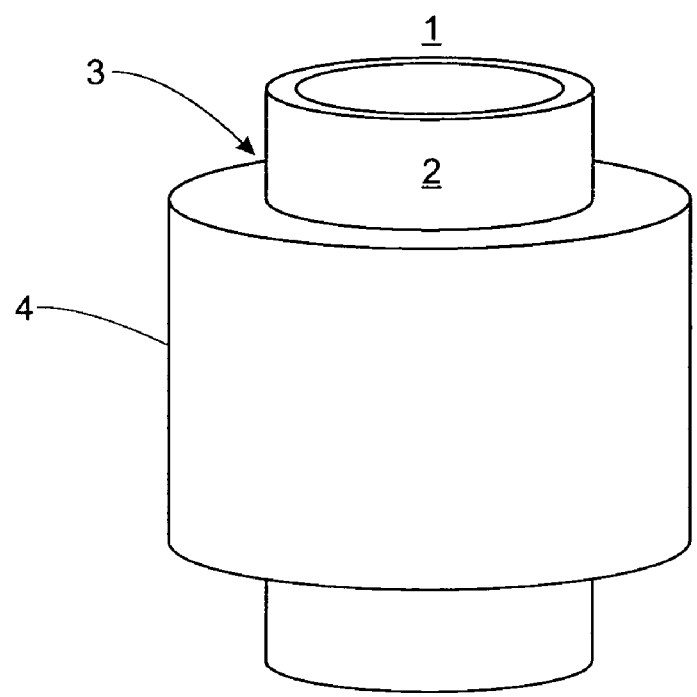
FIG. 1 is a diagram of a boiler tube stub in an opening in a section of boiler drum.
Figure 2:
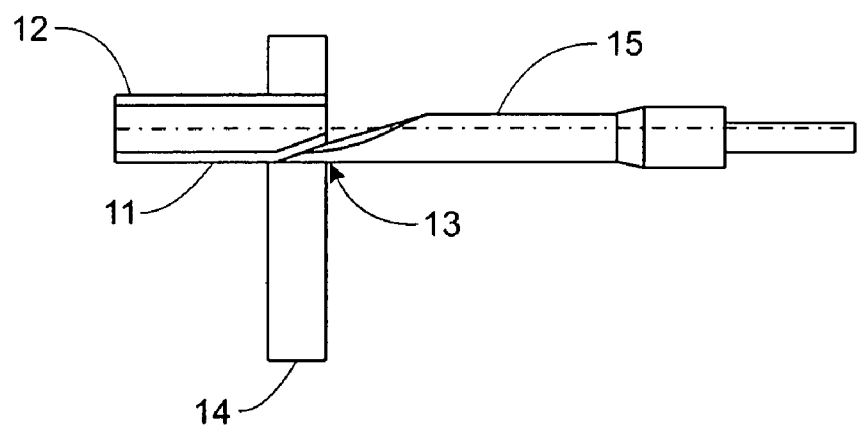
FIG. 2 is a diagram of a collapsing tool (from the prior art) peeling away the remaining thin shell of a boiler tube stub.
Figure 3:
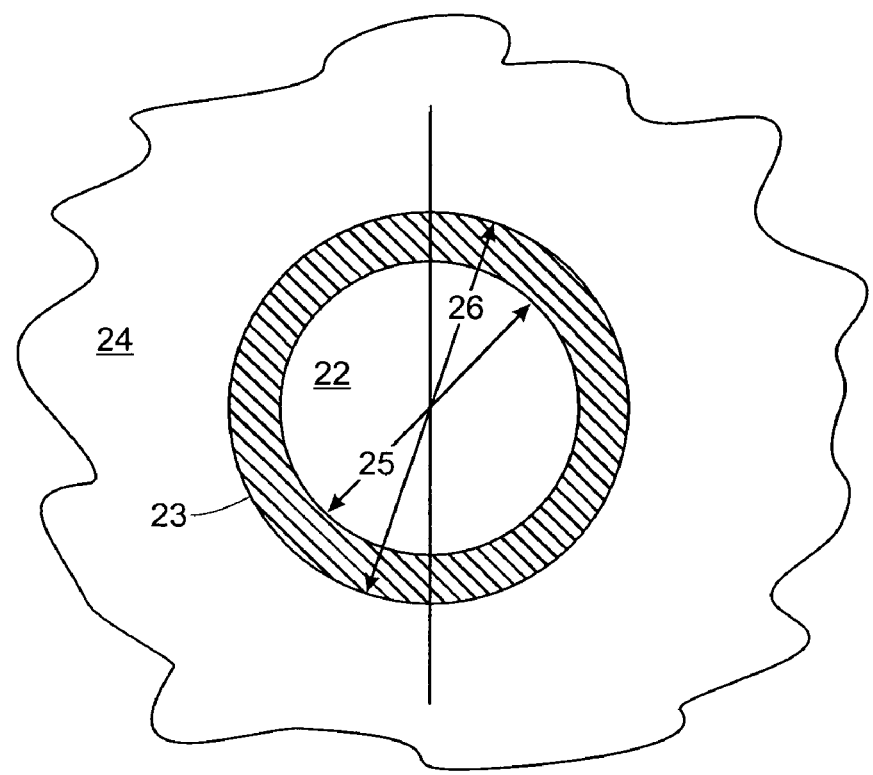
FIG. 3 is an end-on diagram of a boiler tube stub in a hole in a boiler drum.
Figure 4:
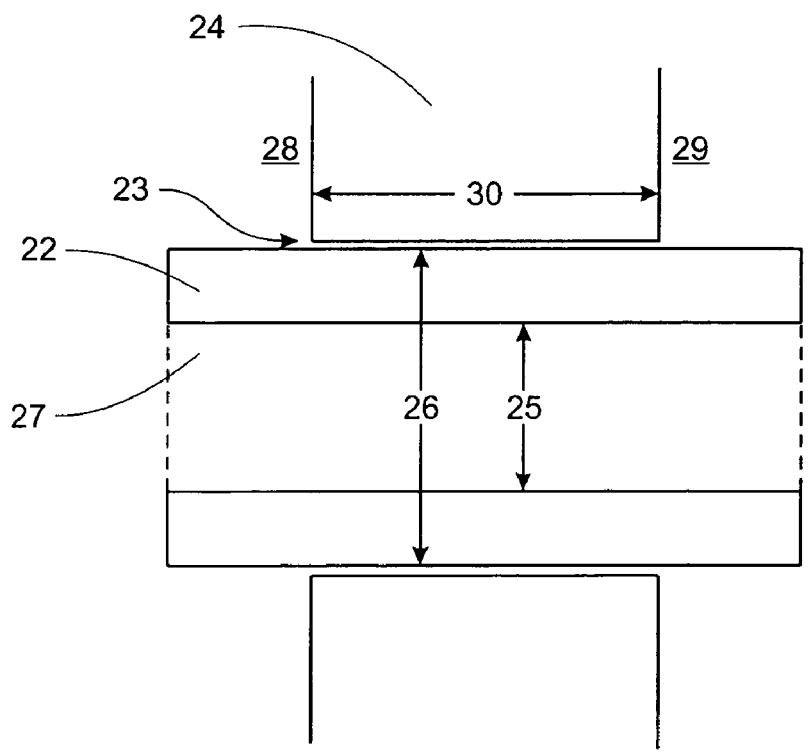
FIG. 4 is a cut-away side view diagram of the boiler tube stub in a hole in a boiler drum shown in FIG. 3.

FIG. 3 shows a boiler tube stub 22 in an opening 23 in a boiler drum 24. The boiler tube stub has an original inner diameter 25 and an outer diameter 26. FIG. 4 then shows a cross-sectional side view of the boiler tube stub of FIG. 3. FIG. 4 also shows the inner surface 27 of the boiler tube stub and the inner wall 28 and the outer wall 29 of the boiler drum 24.

In a preferred embodiment, a rotary cutting tool, such as that described in U.S. patent application Ser. No. 12/215,951, which is incorporated herein by reference, is chosen so that the cutting tool has a diameter larger than the original inner diameter 25 of the boiler tube stub 22 but smaller than the outer diameter 26 of the boiler tube stub 22. The rotary cutting tool is advanced into the boiler tube stub 22 to remove material from the inner surface 27 of the boiler tube stub 22 leaving a shell of the boiler tube stub 22 for a removal length 36 at least as long as the distance between the outer wall 29 and inner wall 28 of the boiler drum 24. The remaining length of the boiler tube stub continues to have its original inner diameter 25. The rotary cutting tool is then withdrawn. There are also other means for removing all but a shell of the boiler tube stub 22 known to those skilled in the art, including the rotary cutting tool described in U.S. Pat. No. 7,093,360.

Figure 5:
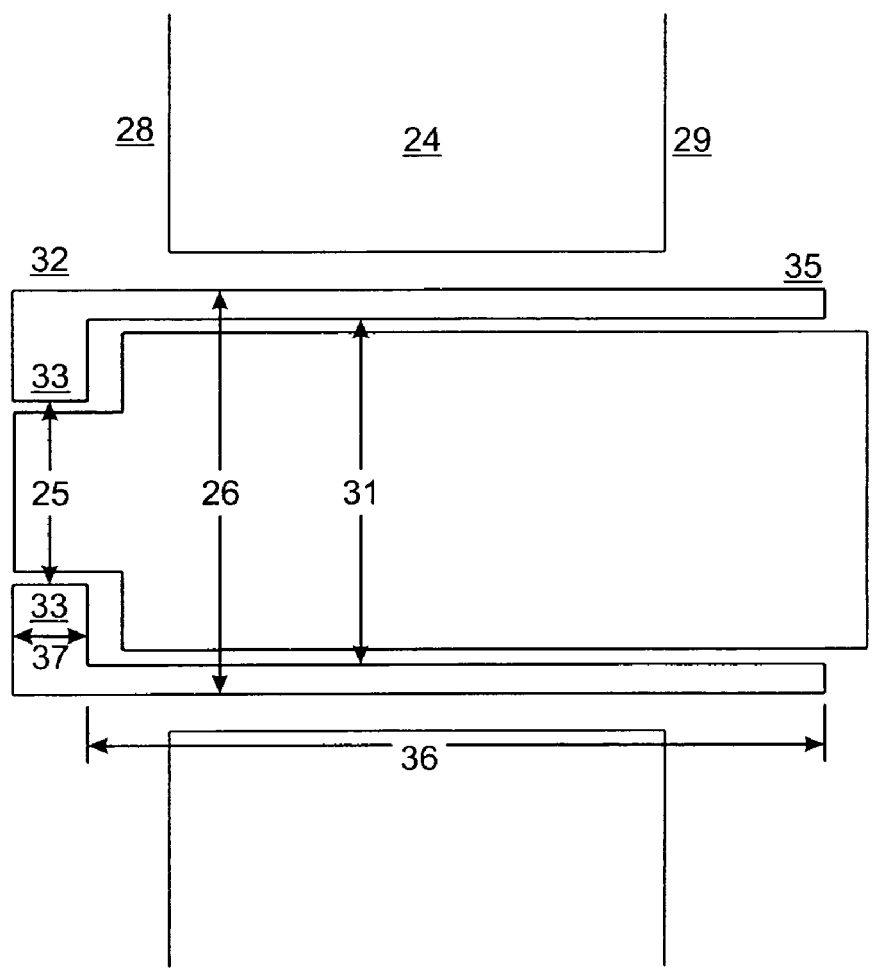
FIG. 5 is a cut-away side view diagram of the remaining shell of a boiler tube stub.

FIG. 5 shows the boiler tube stub 32 after preparation by a rotary cutting tool. The shell 35 of the boiler tube stub 32 of removal length 36, which is at least as long as the distance between the inner wall 28 and the outer wall 29 of the boiler drum 24, now has a new inner diameter 31 greater than the original inner diameter 25 of the boiler tube stub. The remaining length 37 of the boiler tube stub, from which no material has been removed from its inner surface 27, still has its original inner diameter 25. The intersection of the shell 35 and the remaining length 37 of the boiler tube stub produces a shoulder 33.

Figure 6:
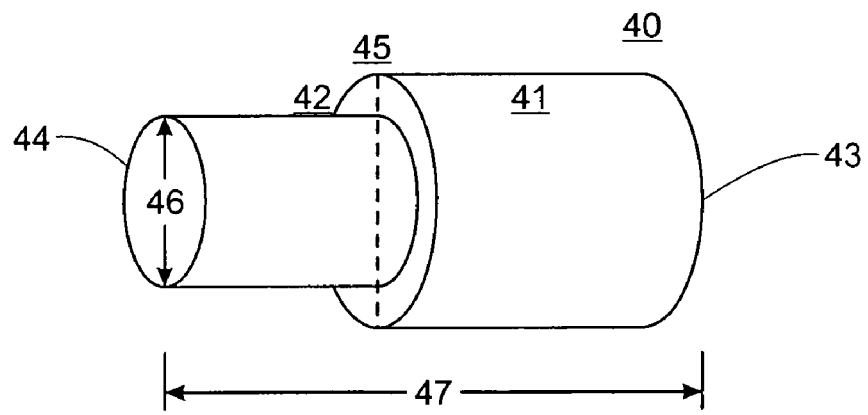
FIG. 6 is a diagram of a preferred embodiment of the plug of the present invention.

A plug is used to punch out the remaining boiler tube stub 32. The plug 40, as shown in FIG. 6, has a cylindrical plug body 41 with a first end 42 and a second end 43. A plug extension 44 extends from the first end 42 of the plug body 41. The plug body 41 has a diameter 45 larger than the original inner diameter 25 of the tube stub 32 and smaller than the new inner diameter 31 of the shell 35 of the boiler tube stub 32. The plug extension 44 has a diameter 46 smaller than the original inner diameter 25 of the boiler tube stub 22. The length of the plug body 47 is longer than the removal length 36.

As shown in FIG. 5, in order to remove the remaining boiler tube stub 32, the plug 40 is inserted into the shell 35 of the boiler tube stub 32, plug extension 44 first. The plug extension 44 is inserted into the remaining length 37 of the boiler tube stub 22 from which no material has been removed from its inner surface 27. The first side 42 of the plug body 41 rests against the shoulder 33 in the boiler tube stub, and the second side 43 of the plug body 41 extends outside the shell 35 of the boiler tube stub 32. Force is applied to the second side 43 of the plug body 41 to punch the remaining boiler tube stub out of the opening in the boiler drum 24. Force can be applied manually or through the use of various power tools.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A system for removing a boiler tube stub comprising,
    a means for removing material from an inner surface of the boiler tube stub for a removal length leaving a shell of a removal length with a new inner diameter larger than an original inner diameter of the boiler tube stub and a remaining length of the boiler tube stub, from which no material has been removed from the inner surface, of the original inner diameter, such that there is a shoulder at the intersection of the shell and remaining length of the boiler tube stub,
    a plug with a plug body of a length greater than the removal length of the shell, said plug body having a first side, a second side and a diameter larger than the original inner diameter of the tube stub and smaller than the new inner diameter of the shell, and
    a plug extension extending from the first side of the plug body having a diameter smaller than the original diameter of the boiler tube stub, such that the plug extension enters the remaining length of the boiler tube stub when the plug is inserted into the shell and the first side of the plug rests on the shoulder at the intersection of the shell and the remaining length of the boiler tube stub.

2. A method for removing a boiler tube stub comprising,
    removing material from an inner surface of the boiler tube stub for a removal length, leaving a shell of a removal length with a new inner diameter larger than an original inner diameter of the boiler tube stub and a remaining length of the boiler tube stub, from which no material has been removed from the inner surface, of the original inner diameter, such that there is a shoulder at the intersection of the shell and the remaining length of the boiler tube stub,
    selecting a plug with
    a plug body of a length greater than the removal length of the shell, said plug body having a first side, a second side and a diameter larger than the original inner diameter of the tube stub and smaller than the new inner diameter of the shell, and
    a plug extension extending from the first side of the plug body having a diameter smaller than the original diameter of the boiler tube stub,
    inserting the plug into the shell such that the plug extension enters the remaining length of the boiler tube stub and the first side of the plug rests on the shoulder at the intersection of the shell and the remaining length of the boiler tube stub, and
    exerting sufficient force on the second side of the plug body to punch out the boiler tube stub.

\* \* \* \* \*